(12) United States Patent
Renforth et al.

(10) Patent No.: US 10,306,951 B2
(45) Date of Patent: Jun. 4, 2019

(54) METAL BUCKLE

(71) Applicant: Doskocil Manufacturing Company, Inc., Arlington, TX (US)

(72) Inventors: Jack W. Renforth, Azle, TX (US); Doug Golenz, Littleton, CO (US); Phil Rowe, Frisco, CO (US)

(73) Assignee: DOSKOCIL MANUFACTURING COMPANY, INC, Arlington, TX (US)

( * ) Notice: Subject to any disclaimer, the term of this patent is extended or adjusted under 35 U.S.C. 154(b) by 10 days.

(21) Appl. No.: 15/660,414

(22) Filed: Jul. 26, 2017

(65) Prior Publication Data

US 2018/0027929 A1 Feb. 1, 2018

Related U.S. Application Data

(60) Provisional application No. 62/369,673, filed on Aug. 1, 2016.

(51) Int. Cl.
*A44B 11/26* (2006.01)
*A01K 27/00* (2006.01)
*A44B 11/25* (2006.01)
*A44B 11/00* (2006.01)

(52) U.S. Cl.
CPC .......... *A44B 11/266* (2013.01); *A01K 27/001* (2013.01); *A44B 11/2519* (2013.01); *A44B 11/2561* (2013.01); *A44B 11/006* (2013.01); *A44B 11/2553* (2013.01)

(58) Field of Classification Search
CPC . A01K 27/001; A44B 11/006; A44B 11/2519; A44B 11/2553; A44B 11/2561; A44B 11/266
See application file for complete search history.

(56) References Cited

U.S. PATENT DOCUMENTS

| | | | |
|---|---|---|---|
| 6,378,466 B1 * | 4/2002 | Oyster | A01K 27/00 119/863 |
| 6,757,944 B2 * | 7/2004 | Buscart | A44B 11/006 24/200 |
| 6,792,654 B2 | 9/2004 | Schmitz | |
| 2005/0055810 A1 * | 3/2005 | Loughlin | A44B 11/266 24/615 |
| 2013/0192033 A1 * | 8/2013 | Hortnagl | A44B 11/2519 24/633 |

* cited by examiner

*Primary Examiner* — Robert Sandy
*Assistant Examiner* — David M Upchurch
(74) *Attorney, Agent, or Firm* — Global IP Counselors, LLP

(57) ABSTRACT

A metal buckle includes a metal receptacle member and a metal clasp. The metal receptacle member includes a first opening and second opening. The metal clasp is configured to be inserted into the first opening of the metal receptacle member, and includes a base member, a locking device and a spring. The spring is configured to bias the locking device outwardly from the base member, and the locking device is configured to engage the second opening of the metal receptacle.

10 Claims, 7 Drawing Sheets

METAL BUCKLE

CROSS-REFERENCE TO RELATED APPLICATION

This application claims priority to U.S. Provisional Application No. 62/369,673, filed Aug. 1, 2016, the contents of which are hereby incorporated herein by reference.

BACKGROUND

Object of the Invention

The present invention is directed to metal buckle. In particular, the present invention related to a snap fit metal buckle for an animal collar or similar device.

Description of Related Art

Conventional snap fit buckles buckle include a separable cooperating receptacle member and a clasp member both molded from a tough resilient plastic material such as nylon. The receptacle member and the clasp member each include cooperating coupling or locking device for releasably coupling the clasp and receptacle members. The locking or coupling device of the receptacle includes a pair of through slots, formed in facing relation in the top and bottom walls. It will be noted that the sides of the slots extend into the respective side walls for a minor fractional part thereof, and are spaced apart from the end opening.

The clasp member includes a pair of resilient arms and an end or base portion joining the arms. A pair of locking tab devices comprising raised edge portions are formed at leading edges of the arms and are spaced apart somewhat in excess of the extent of the opening. The raised edge portions decrease in widths towards the leading edge thereof to define a pair of ramps thereon. Leading edges of said ramps are spaced apart a distance somewhat less than the extent of the opening between the walls of the receptacle. The raised portions of the arms, including the leading ramp portions thereof are substantially equal in length to the lengthwise extent of the slots of the receptacle.

The clasp member is inserted into the open end of the receptacle, the leading edges of the ramps thereof slidingly engaging the inner sides of the side walls. The resilient arms are configured to flex inwardly as the clasp is inserted into the receptacle. Thus, as the trailing ends of the raised portions reach the slots thereof, the resilient arms spring or snap back to their original configuration, locking the tabs comprising the raised portions within the slots, so as to prevent removal of, or motion of, the clasp member.

SUMMARY

It has been determined that the plastic snap fit buckles are not as appealing and durable as desired. Accordingly, a need exists for a more aesthetically pleasing and durable snap fit buckle for animal collars. Such a buckle includes a metal receptacle member and a metal clasp member. The metal receptacle member includes a first opening and second opening. The metal clasp member is configured to be inserted into the first opening of the metal receptacle member, and includes a base member, a locking device and a spring. The spring is configured to bias the locking device outwardly from the base member, and the locking device is configured to engage the second opening of the metal receptacle.

BRIEF DESCRIPTION OF THE DRAWINGS

The invention will be explained in more detail hereinafter with reference to the drawings.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
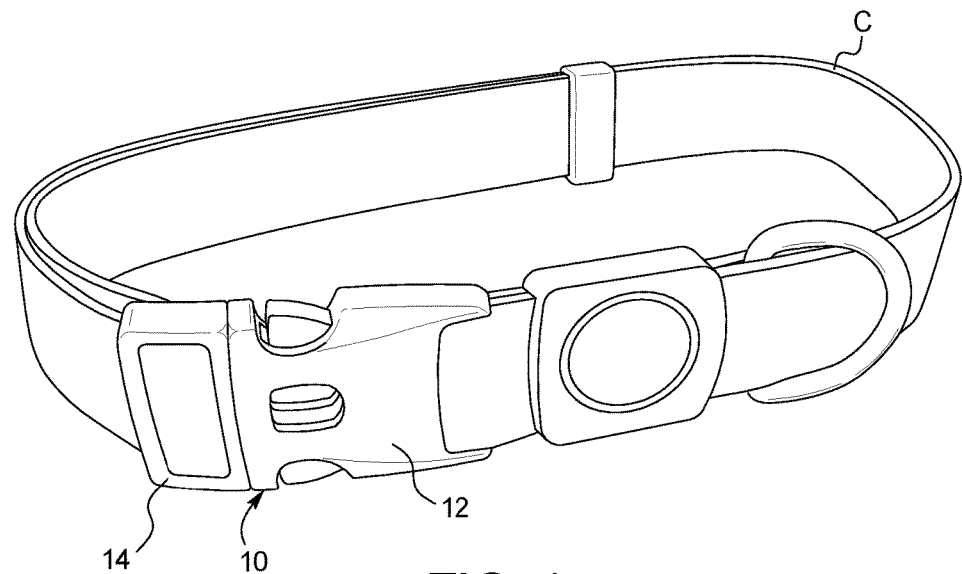
FIG. 1 illustrates a buckle according to an embodiment of the present invention attached to a collar.

Referring initially to FIG. 1, a buckle 10 is illustrated in accordance with one embodiment. In this embodiment, the buckle 10 is attached to a collar C and is in a locked position. The buckle 10 is preferably a metal buckle. As shown in FIGS. 2-10 the buckle 10 includes a first metal member 12 and a second metal member 14. Preferably, the first and second members 12 and 14 are formed from stainless steel and chrome plated. However, the buckle 10 can be any suitable material, including plastic.

As shown in FIGS. 2-5, the first member 12 is a receptacle member and the second member 14 is a clasp member (clasp). The receptacle member 12 comprises a generally flat rectangular body 20 having side walls 22 and 24, top and bottom walls 26 and 28 and an end opening 29 for receiving the clasp member 14. The walls and of the receptacle member 12 for an interior area A that is generally accessible through the opening 29. In one embodiment, the top and bottom walls 26 and 28 define a larger surface area than the side walls 22 and 24.

The side walls 22 and 24 include openings 30 and 32 for locking mechanisms 34 and 36 of the clasp member 14. The openings 30 and 32 can extend partially into the top and bottom walls 26 and 28, and enable access into the interior area A of the receptacle member 12. The openings 30 and 32 are preferably arcuate in shape and are adjacent the end opening 29. Generally, the end 33 of the receptacle member 12 opposite the end opening 29 includes a mechanism 35 such as a longitudinal rod or bar for coupling to a strap (e.g., collar C). In one embodiment, there is a generally rectangular opening O1 on the top surface 26 generally corresponding to the generally rectangular opening O2 on the bottom surface 28 of the receptacle member 12.

Figure 6:
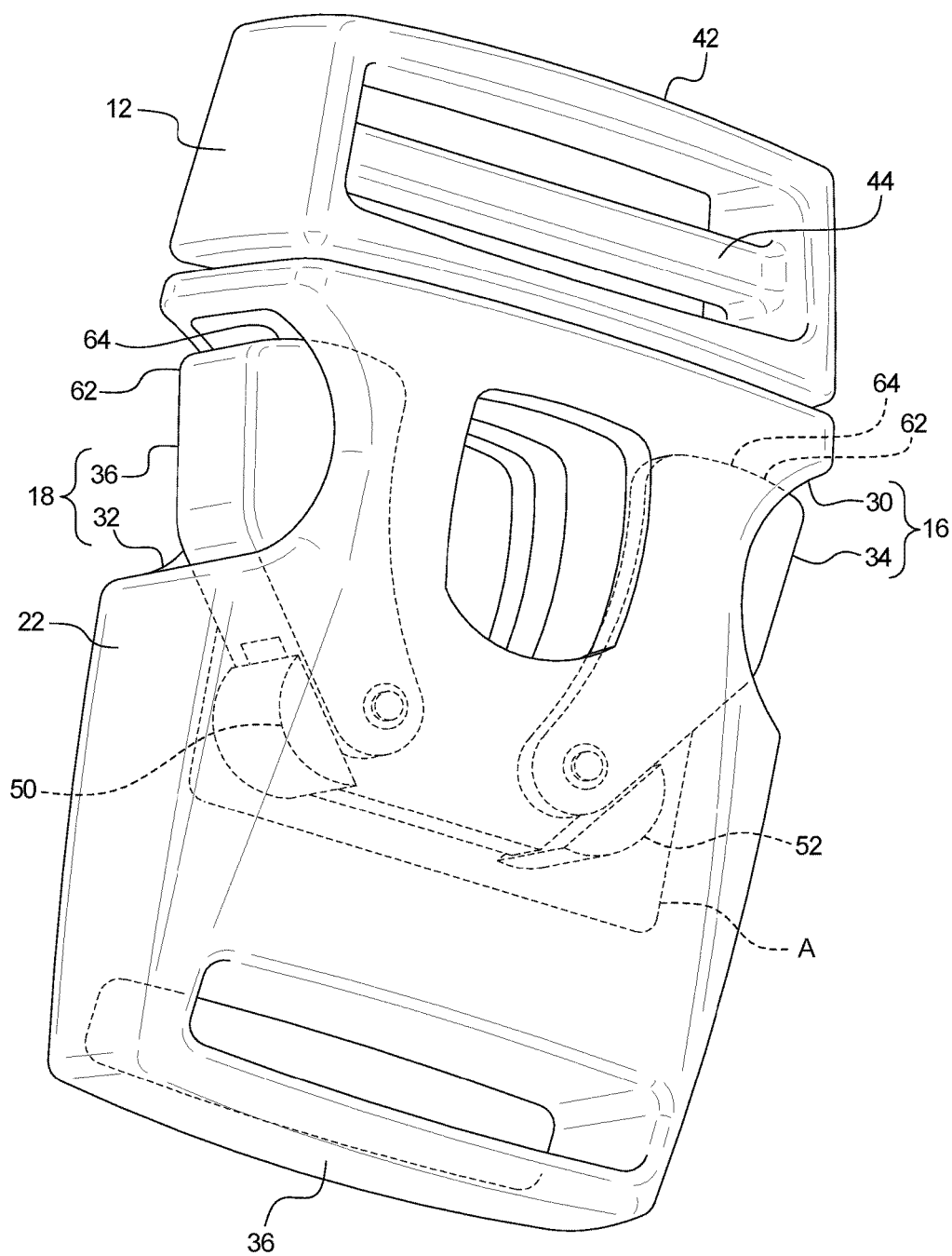
FIG. 6 is a bottom perspective view of the buckle of FIG. 1 in a latched position with portions of the clasp member shown in phantom.
Figure 7:
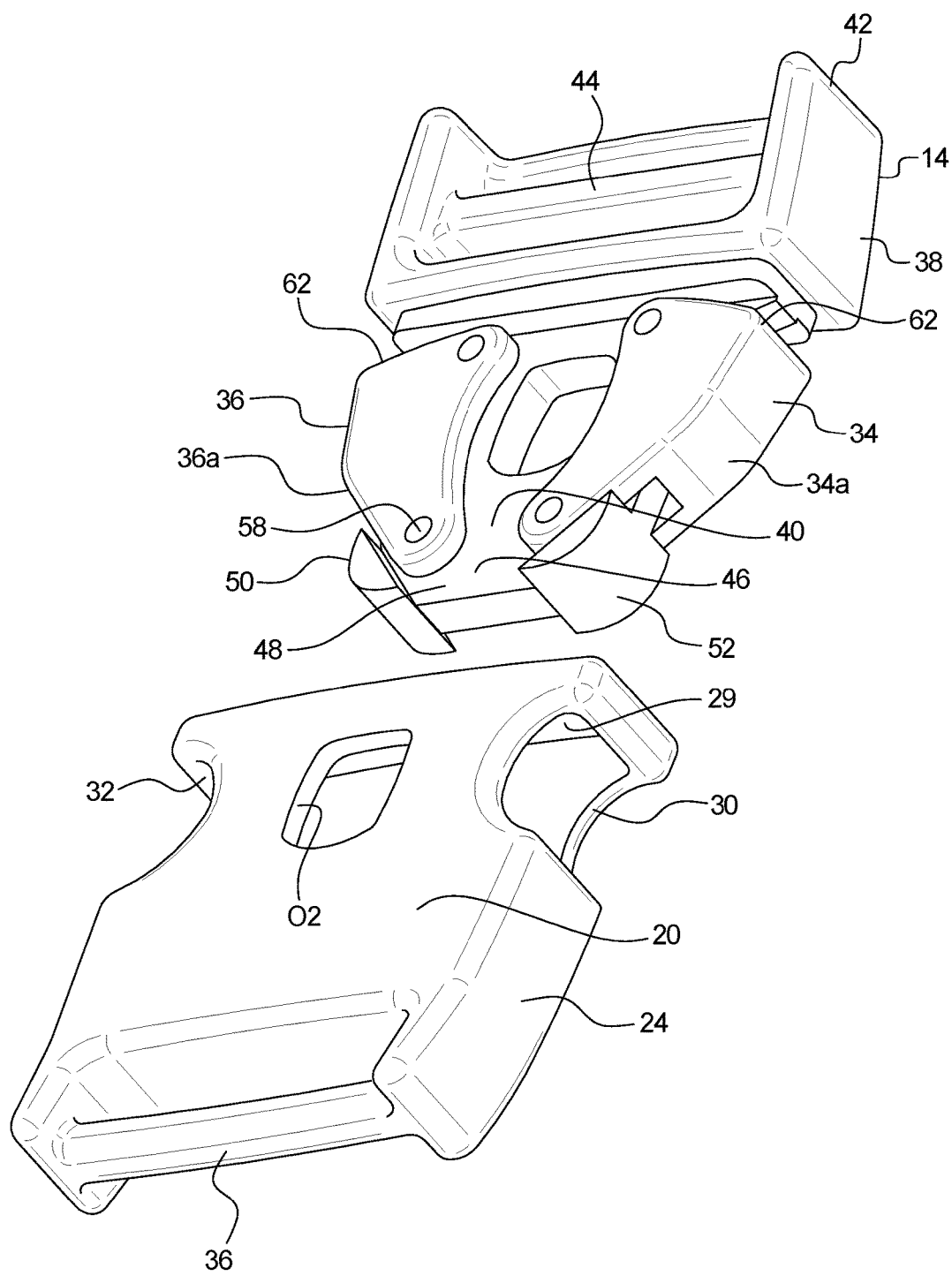
FIG. 7 is an exploded bottom perspective view of the buckle of FIG. 1 in an unlatched position.
Figure 8:
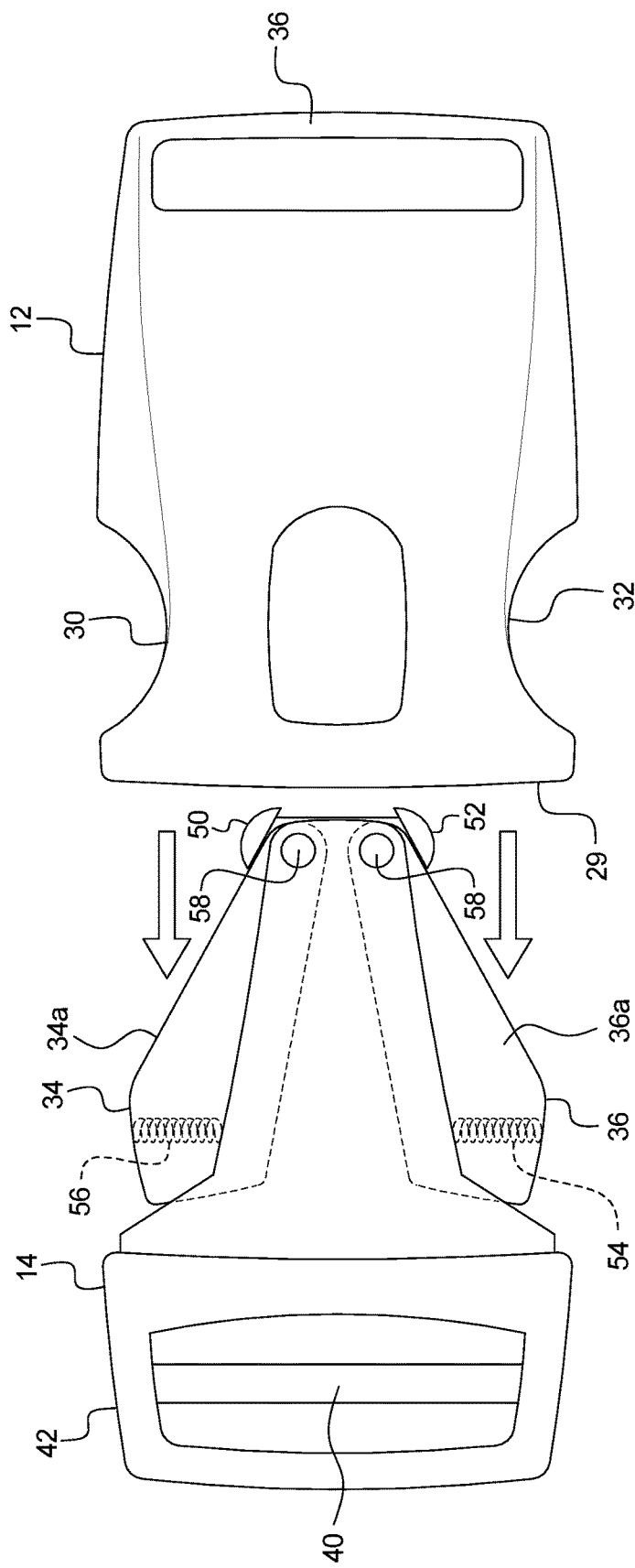
FIG. 8 is exploded bottom view of the buckle in an unlatched position and the locking devices in a retracted position.

As shown in FIG. 6-8, the clasp member 14 includes a base 38 and a locking member 40 that includes locking mechanisms 34 and 36. The locking member 40 is sized and configured to be capable of fitting within the internal area A of the receptacle member 12. One end 42 of the base 38 includes a connecting portion 44 configured to connect to the other end of the strap (e.g., collar C). The locking member 40 includes a generally rectangular base member 46. The base member 46 extends from the base 38 and has a generally flat configuration. The end 48 distal from the connecting portion 44 has two generally triangular restricting members 50 and 52. The restricting members 50 and 52 are preferably disposed at the corners of the base member 46 and are configured to restrict movement of the locking end 40 within the receptacle member 12. The restricting members 50 and 52 can be formed to be malleable or compressible to absorb and conform to the interior area A of the receptacle member 12, thus forming a tight fit therein. Alternatively, a compressible member (not shown) can be disposed within the restricting members 50 and 52 to enable absorption. However, it is noted that the restricting members 50 and 52 can be rigid and formed from any suitable material, such as plastics of metals.

Figure 2:
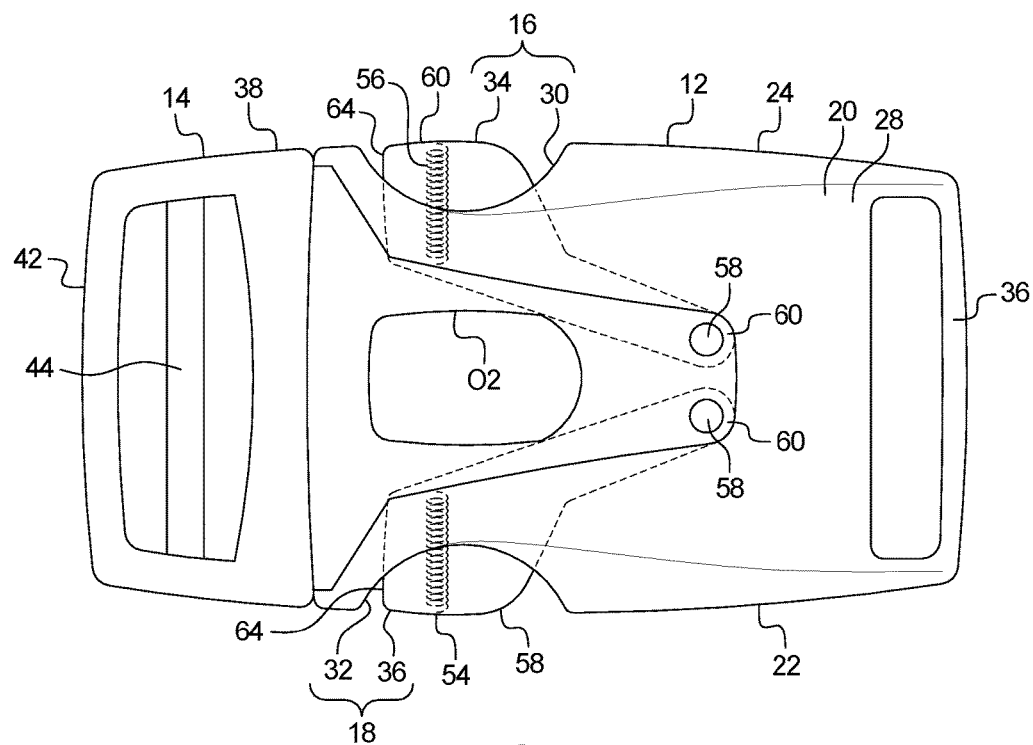
FIG. 2 is a bottom schematic view of the buckle of FIG. 1 with the locking devices shown in phantom and in a latched position.
Figure 3:
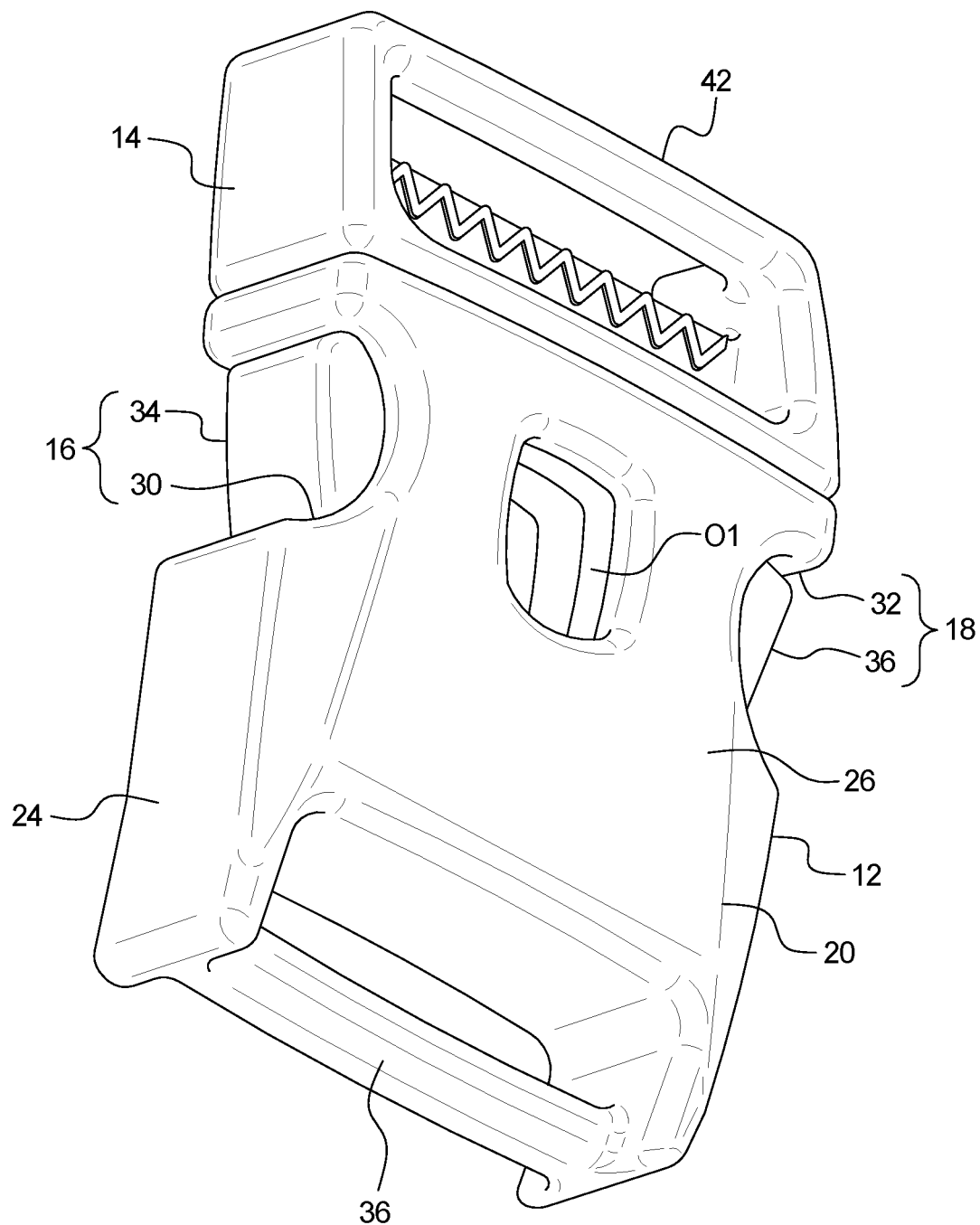
FIG. 3 is a top perspective view of the buckle of FIG. 1 in a latched position.
Figure 4:
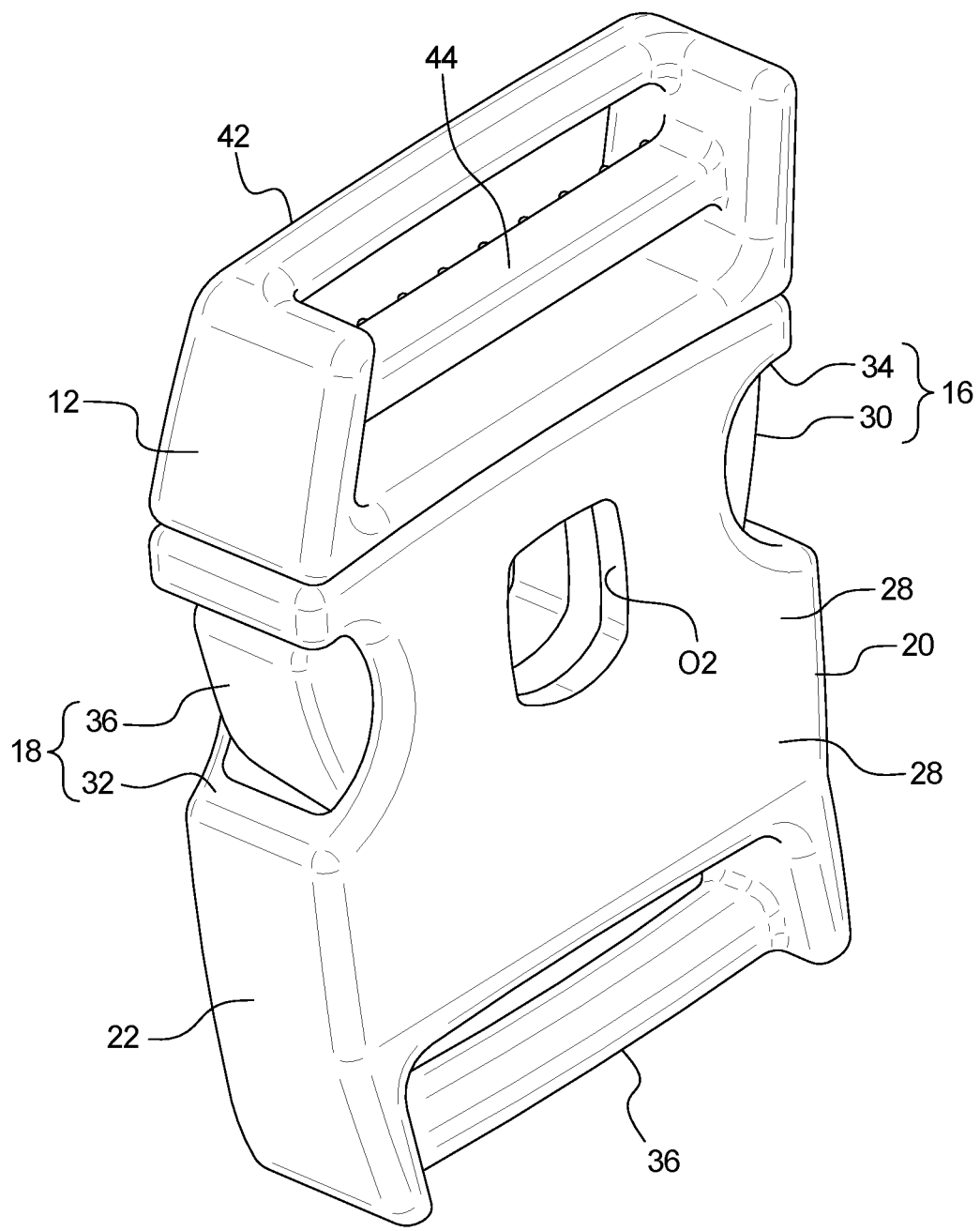
FIG. 4 is bottom perspective view of the buckle of FIG. 1 in a latched position.
Figure 5:
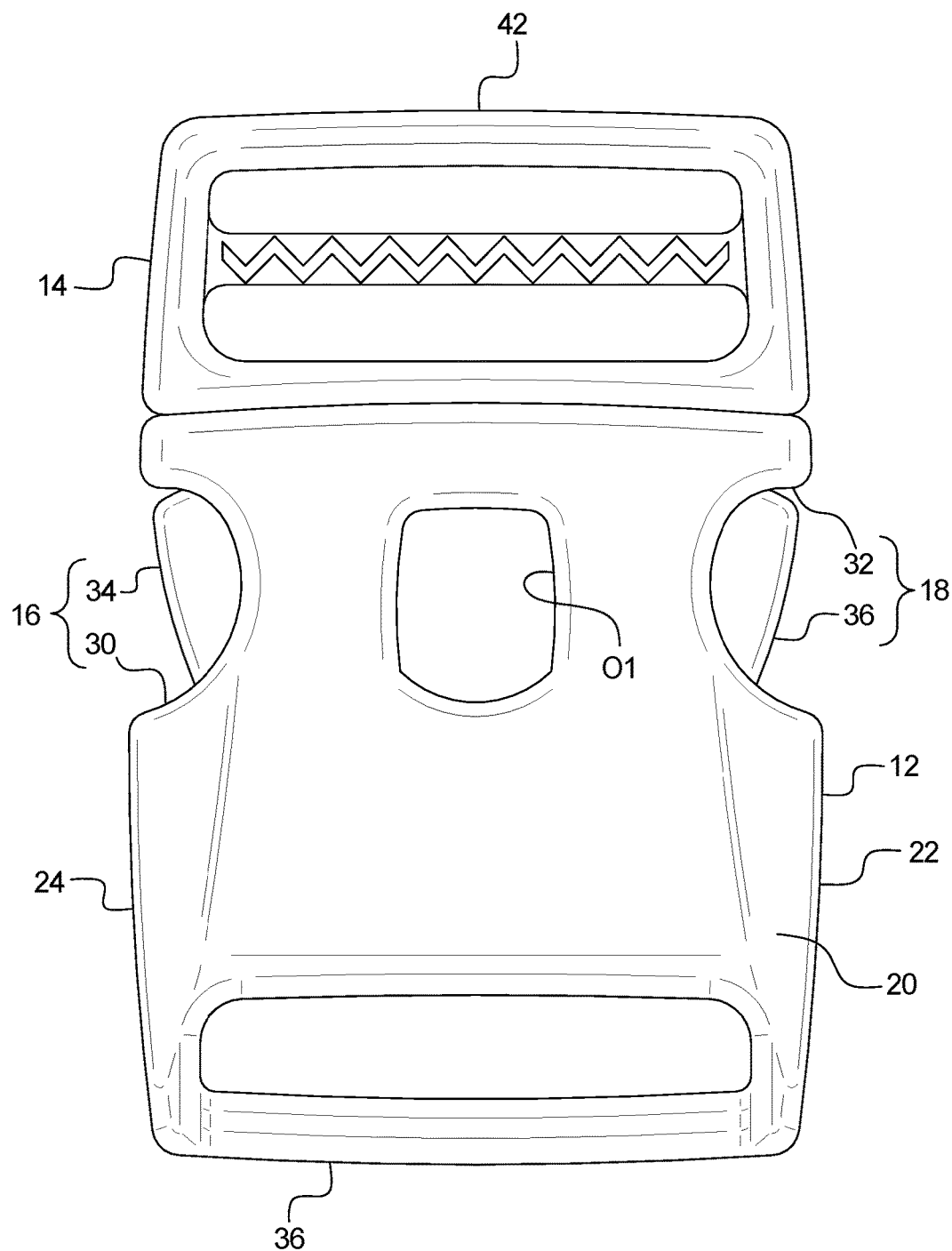
FIG. 5 is a bottom plan view of the buckle of FIG. 1 in a latched position.

As shown in FIG. 2, the locking mechanisms 34 and 36 preferably have springs 54 and 56, so as to form spring loaded protrusions 58 and 60 extending from the sides of the base member 46. That is, in one embodiment, the locking mechanisms 34 and 36 are biased outwardly from the base member 46. The springs (or biasing members) 54 and 56 have one end adjacent the base member 46 and the opposite end adjacent the inner surface of a respective locking mechanism 34 and 36. Accordingly, the springs 54 and 56 bias the locking mechanisms 34 and 36 outwardly away from the side of the base member 46.

In one embodiment, the locking mechanisms 34 and 36 angle outwardly such that outer surfaces 34*a* and 36*a* have a ramped configuration. That is, when the springs 54 and 56 are biasing the locking mechanisms 34 and 36 outwardly, the outer surfaces 34*a* and 36*a* form an angle with the sides of the base member 46. The locking mechanisms 34 and 36 are pivotably coupled to the base member using a pin 58 at a first end 60. The pin 58 is disposed adjacent a surface of the restricting member 50, 52. The second end 62 of the locking mechanisms 34 and 36 includes a locking surface 64 and preferably extends transversely to the longitudinal direction of the base member 46. Thus, the locking mechanisms, can pivot around a respective pin 58.

It will be appreciated from the foregoing description, that the clasp member 14 may be readily inserted into the open end 29 of the receptacle member 14. Since the outer surfaces 34*a* and 36*a* have a ramped configuration, the surfaces will slidingly engaging the inner sides of the side walls of the receptacle member 14. The locking mechanisms 34 and 36 are configured to be biased inwardly against the force of the springs 54 and 56 as the clasp member 14 is inserted into the receptacle member 12. Thus, the locking mechanisms 34 and 36 will pivot around a respective pin 58 with the force against the outer surfaces 34*a* and 36*a* overcoming the biasing force of the springs 54 and 56.

Accordingly, each of the locking mechanisms 34 and 36 is guided into the openings 30 and 32 and the trailing ends (locking surfaces) of the locking mechanisms 34 and 36 reach the slots or openings 30 and 32 of the receptacle member 12, the locking mechanisms 34 and 36 are biased outwardly by the springs and snap back to their rest configuration, locking the locking mechanisms 34 and 36 in the slots or openings in the receptacle member 12, so as to prevent removal of, or motion of, the clasp member 14. In such a manner, the locking mechanisms 34 and 36 and the openings 30 and 32 form locking devices 16 and 18. This locking action will cause an audible clicking noise, since each of the members is formed from metal.

Moreover, the restricting members 50 and 52 engage the walls of the interior area A causing a tight fit therein to avoid undesired movement of the base member 46 of the clasp member 14 in the interior area A.

As shown in FIG. 10, releasing the locking mechanisms 34 and 36 from the slots for removal of the clasp member 14 from the receptacle member 12 is performed by applying inward pressure upon the locking mechanisms 34 and 36. This action results in the locking mechanisms 34 and 36 moving inwardly against the biasing force of the springs 54 and 56, such that the distance between the locking mechanisms 34 and 36 is somewhat less than the distance between the side walls 22 and 24 of the receptacle member 12, whereby the clasp member 14 can be readily removed therefrom. As can be understood, the locking surfaces 64 will disengage from the openings 30 and 32 of the receptacle member 12, enabling the clasp member 14 to be removed from the receptacle member 12.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Accordingly, these terms, as utilized to describe the present invention should be interpreted relative to a metal buckle.

The terms of degree such as "substantially", as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A metal buckle, comprising:
   a metal receptacle member with a first opening and second opening; and
   a metal clasp configured to be inserted into the first opening of the metal receptacle member, and including a base member, a locking mechanism and a spring, the spring configured to bias the locking mechanism outwardly from the base member, the locking mechanism configured to engage the second opening of the metal receptacle, the base member including a restricting member configured to restrict movement of the base member within the receptacle member; and the restricting member being generally triangular and compressible.

2. The metal buckle of claim 1, wherein
the metal receptacle includes a third opening, the locking mechanism is a first locking mechanism, the spring is a first spring, the metal clasp including the second locking mechanism and the second spring, the second spring configured to bias the second locking mechanism outwardly from the base member, and the second locking mechanism configured to engage the third opening of the metal receptacle.

3. The metal buckle of claim 2, wherein
the first and second locking mechanisms are on opposite sides of the metal clasp.

4. The metal buckle of claim 2, wherein
the first spring biases the first locking mechanism in a first direction and the second spring biases the second locking mechanism in a second direction, the first direction being opposite to the second direction.

5. The metal buckle of claim 1, wherein
the spring is configured to be compressed between a side of the base member and the locking mechanism.

6. The metal buckle of claim 1, wherein
the locking mechanism comprises a locking surface configured to engage a surface of the second opening.

7. The metal buckle of claim 6, wherein
the locking surface extends transversely to a longitudinal direction of the base member.

8. The metal buckle of claim 1, wherein
the locking mechanism is configured to pivot around a pin.

9. The metal buckle of claim 1, wherein
the locking mechanism includes an outer surface forming an angle with a side of the base member.

10. The metal buckle of claim 9, wherein
the outer surface is configured to engage a surface to the second opening to cause the locking mechanism to be biased inwardly.

\* \* \* \* \*